(12) United States Patent
Waller

(10) Patent No.: US 8,799,981 B2
(45) Date of Patent: Aug. 5, 2014

(54) PRIVACY PROTECTION SYSTEM

(75) Inventor: Adrian Waller, Didcot (GB)

(73) Assignee: Thales Holdings UK PLC, Surrey (GB)

( * ) Notice: Subject to any disclaimer, the term of this patent is extended or adjusted under 35 U.S.C. 154(b) by 1089 days.

(21) Appl. No.: 11/737,407

(22) Filed: Apr. 19, 2007

(65) Prior Publication Data

US 2007/0250904 A1    Oct. 25, 2007

(30) Foreign Application Priority Data

Apr. 19, 2006    (GB) .................................. 0607714.3

(51) Int. Cl.
*H04L 9/00*    (2006.01)
*G06F 21/62*    (2013.01)
*H04L 9/30*    (2006.01)

(52) U.S. Cl.
CPC .......... *G06F 21/6245* (2013.01); *H04L 9/3073* (2013.01)
USPC .................................................. 726/1; 726/2

(58) Field of Classification Search
CPC .......................... G06F 21/6245; H04L 9/3073
USPC .............. 726/9, 26, 27, 28, 29; 713/224, 201, 713/212, 213, 220, 223; 709/204, 201, 220, 709/227; 389/200, 201, 202, 203, 227
See application file for complete search history.

(56) References Cited

U.S. PATENT DOCUMENTS

| | | | |
|---|---|---|---|
| 2003/0084300 | A1 | 5/2003 | Koike |
| 2004/0093273 | A1* | 5/2004 | Laurent et al. .................. 705/26 |
| 2005/0060561 | A1 | 3/2005 | Pearson et al. |
| 2005/0251865 | A1* | 11/2005 | Mont et al. ....................... 726/26 |
| 2008/0141337 | A1* | 6/2008 | Yeung et al. ...................... 726/1 |

FOREIGN PATENT DOCUMENTS

| | | |
|---|---|---|
| EP | 1 349 034 A2 | 10/2003 |
| EP | 1 583 322 A2 | 5/2005 |
| WO | 2004/047398 A1 | 5/2004 |

OTHER PUBLICATIONS

Liberty Alliance Project, "Liberty Architecture Framework for Supporting Privacy Preference Expression Languages (PPELs)", Version 1.0, Nov. 12, 2003, http://www.projectliability.org/specs/Final_PPEL_White_paper.pdf.
Liberty Alliance Project, "Liberty architecture framework for supporting Privacy Preference Expression Language (PPELs)", Version 1.0, Nov. 12, 2003 http://www.projectliberty.org/specs/Final_PPEL_White_Paper.pdf.
Menezes A. et al. "Handbook of Applied Cryptography, Key Management Techniques," Handbook of Applied Crytography, XX, XX, Jan. 1, 1996, pp. 543-590.

* cited by examiner

*Primary Examiner* — Jeffrey Pwu
*Assistant Examiner* — Nega Woldemariam
(74) *Attorney, Agent, or Firm* — Lowe Hauptman & Ham, LLP

(57) ABSTRACT

A method and system is disclosed for enforcing at least one privacy policy in relation to user data, the system comprising: a user system, a broker system, and a service provider system, the user system being operable to: encrypt the user data using a symmetric encryption algorithm and an encryption key generated in dependence on said at least one privacy policy and a master key associated with the user system; and transmit the encrypted user data to the service provider in the form of a digital container that includes the encrypted user data and said at least one privacy policy; and the broker system being operable to: receive a request from the service provider to access the user data, the request including said at least one privacy policy; verify that the request complies with said at least one privacy policy; and if so, regenerate the encryption key in dependence on the master key and at least one privacy policy supplied by the service provider, whereby the service provider system is able to decrypt the user data using a symmetric decryption algorithm and the regenerated encryption key.

22 Claims, 14 Drawing Sheets

PRIVACY PROTECTION SYSTEM

RELATED APPLICATIONS

The present application is based on, and claims priority from, Great Britain Application Number 0607714.3, filed Apr. 19, 2006, the disclosure of which is hereby incorporated by reference herein in its entirety.

The present invention relates to a method, a user computer system, a broker computer system and a service provider computer system for enforcing at least one privacy policy in relation to user data.

The need to protect consumer privacy on the Internet is becoming an increasing concern. It is now commonplace for users of service providers to be required to provide personal information to the service providers in order to receive their services. The use of this personal information by the service providers is normally of benefit both to the service providers and the users (to allow the service providers to perform customer profiling and carry out marketing activities and to allow the user to tailor services to his needs, for example).

However there is the potential for service providers to exploit a user's personal data against his wishes and to thus to compromise his privacy. The problem thus arises of how to protect user data and, in more detail, how to limit its release to unauthorized parties. This problem can be solved to some extent by encrypting the user data and controlling the distribution of decryption keys for decrypting the data.

It is also possible to encode privacy policies in a machine-readable format. The Platform for Enterprise Privacy Practices (E-P3P), for example, specifies a language for defining privacy policies as a series of rules (see "Platform for Enterprise Privacy Practices: Privacy-enabled Management of Customer Data", Karjoth et al, $2^{nd}$ Workshop on Privacy Enhancing Technologies, Lecture Notes in Computer Science, Springer Verlag, 2002). This system relies on voluntary enforcement of privacy policies and, as such, does not provide a means to enforce the privacy policies.

Over the years cryptographic systems have become more and more powerful and sophisticated. Public-key cryptography in particular, in which one key (the 'public key') is used to encrypt data and a second, different key (the 'private key') is used to decrypt it, has revolutionized Internet-based cryptography. Public key systems are now used to encrypt files transferred over the Internet, to create digital signatures on documents, to carry out secure financial transactions, and so on.

The power and sophistication of public-key cryptographic systems would thus appear to be a natural choice for implementing a scheme for enforcing user privacy. However, public-key systems have some disadvantages: they are computationally intensive, thus being unsuitable for low-specification user systems, and custom public-key algorithms would be required to be created to implement a new privacy management system, reducing the appeal to users and developers alike.

It is one object of the present invention to address problems arising in relation to the prior art.

Accordingly, in a first aspect of the invention there is provided a system for enforcing at least one privacy policy in relation to user data, the system comprising: a user system (such as a user's personal computer); a broker system; and a service provider system (such as a web server or ISP server), wherein the user system is operable to: encrypt the user data using a symmetric encryption algorithm (such as AES or DES) and an encryption key generated in dependence on said at least one privacy policy and a master key associated with the user system; and transmit the encrypted user data to the service provider in the form of a digital container that includes the encrypted user data and said at least one privacy policy; and wherein the broker system is operable to: receive a request from the service provider to access the user data, the request including said at least one privacy policy; verify that the request complies with said at least one privacy policy; and if so, regenerate the encryption key in dependence on the master key and at least one privacy policy supplied by the service provider; whereby the service provider system is able to decrypt the user data using a symmetric decryption algorithm and the regenerated encryption key.

In this system, if the service broker requests the encryption key for a reason which does not comply with the user's privacy policies, the broker system will not release the encryption key, and if the service broker alters the privacy policies in order to appear to comply with the user's wishes (for example), the service broker will generate a different encryption key to that used to encrypt the user data. Thus, if the service broker attempts to violate the user's privacy policy, it will not be able to decrypt the user data. Furthermore, the use of symmetric encryption and decryption algorithms allows the system to be simplified, since only one secret key (for both encryption and decryption) is required, compared to public-key systems in which two separate keys are used. Also freely available and/or rigorously tested encryption/decryption algorithms can be used (such as AES and DES), with a further benefit in that less processing power is usually required by such algorithms (compared to public-key algorithms such as PGP). This can increase the scalability of the system, for example.

The step of verifying that the request for an encryption key complies with a privacy policy may include determining attributes of the service provider system making the request and/or determining other factors pertinent to the privacy policy (such as the current time, to ensure that the policy has not expired). The service provider attributes may relate to objectively measurable characteristics of the service provider (such as the number of employees in the organization and/or the data sharing policies of the service provider) or may relate to levels of trust and reliability of the service provider as assessed by a third party, for example. In the latter case, the attributes may be provided directly by the third party (which may be a certifying authority or the like) or may be provided by the service provider, for example in the form of a digital certificate signed by the third party. The attributes of the service provider system may be provided during a registration process, when the service provider and/or trusted third party provide the attribute data to the broker system and carry out authentication and verification steps.

Various aspects of the system may be provided independently. For example, in another aspect of the invention there is provided a user computer system for use in a system for enforcing at least one privacy policy in relation to user data, the computer system comprising: encryption key generation means (such as a processor and associated memory) for generating an encryption key in dependence on a master key and in dependence on privacy policy data representing the or each privacy policy; encryption means (such as the same or a further processor and/or associated memory) for carrying out symmetric encryption of the user data with the encryption key to form encrypted user data; and combiner means (such as the same or a further processor and associated memory) for combining the encrypted user data and privacy policy data to form a digital container for secure transmission of the user data.

The encryption key generation means may be operable to derive the encryption key from an output of a one-way hash function (derived from a block cipher, or a dedicated hash function such as SHA-1, for example) that takes the master key and the privacy policy data as an input, for computational efficiency. The hash function may be selected from a plurality of hash functions (such as different algorithms and/or the same algorithm with different parameters), in which case the combining means may be operable to include hash function identification data in the container, the hash function identification data (such as a fixed-length integer, alphanumeric code or other data item) being associated with the selected hash function. This can provide additional security.

The user computer system may further comprise network interface means (such as a network interface or other input/output device) for communicating with a broker computer system and for transmitting the digital container to a service provider system, and may further comprise secure communication means (such as the same or a further network interface device in combination with the same or a further processor and associated memory, or a dedicated hardware device) for establishing a secure connection with the broker computer system, the user computer system then being operable to transfer the master key between the user computer system and the broker computer system via the secure connection.

The combining means may be operable to include broker identification data (such as a fixed-length integer, alphanumeric code or other data item) in the digital container, the broker identification data being associated with the broker computer system. This can allow the creation of a broker network, where a user or service provider need only ever contact one broker directly; this can allow a user or service provider to establish a long-term relationship with their particular broker, such that the trustworthiness of either party does not have to be established as part of every encryption key transaction.

The combining means may also be operable to include master key identification data (such as a fixed-length integer, alphanumeric code or other data item) in the digital container, the master key identification data being associated with the master key. This can allow the correct master key to be selected by the broker, and can also allow multiple master keys to be used for improved security.

The user computer system may further comprise means for receiving usage data from the broker computer system, the usage data relating to a request to decrypt the digital container received by the broker computer system. This can allow the user to track the usage of his user data, for example.

The user computer system may further comprise means for storing the digital container (such as a hard disk, RAM memory, smart card or other storage device), whereby the digital container can be transmitted on demand, and/or it may be operable to generate and transmit the digital container in response to a request (for example to do so 'on the fly' or 'on demand'). In the former case the amount of processing carried out by the user computer system can be reduced, whereas in the latter case less storage is required and security may be improved.

The user computer system may be operable to execute a web browser plug-in (or equivalent) embodying (for example in combination with a processor and associated memory) at least one of the encryption key generation means, encryption means and combiner means, allowing the privacy management system to be implemented on a wide range of systems with relatively little effort and interfacing required.

In a further aspect of the invention there is provided a broker computer system for use in a system for enforcing at least one privacy policy in relation to user data, the broker computer system comprising: storage means for storing a master key (such as a hard disk, smart card or other storage device); network interface means (such as a network interface card, router, or other networking device) for receiving a request (such as a data packet transmitted over the Internet) to decrypt encrypted user data from a requesting system, the request including privacy policy data representing the or each privacy policy; verification means (such as a processor and associated memory) for verifying that the request complies with the or each privacy policy; and encryption key generation means (such as the same or a further processor and associated memory, or dedicated cryptographic circuitry, for example), operable when the verification means determines that the request does comply with the or each privacy policy, for generating an encryption key, in dependence on the master key and in dependence on the privacy policy data, for transmission to the requesting system.

The broker computer system may further comprise secure communication means for transmitting the encryption key to the requesting system via a secure connection, and may further comprise means for authenticating the requesting system (for example using public-key cryptographic methods or using manual/physical methods). If the storage means is operable to store at least one further master key, the broker computer system may be operable to select the first master key on the basis of master key identification data included in the request to decrypt encrypted user data.

The broker computer system may further comprise a user broker system, including the storage means for storing the master key, and a service provider broker system, the service provider system comprising: means for transmitting a request to the user broker system to obtain a key, the key being one of the master key and the encryption key (preferably the latter, for security reasons); and means for receiving the key from the user broker system in response to the request; and the user broker system comprising: means for receiving a request from the service provider broker system to obtain the key; and means for transmitting the key to the service provider broker system in response to the request. Thus, again, a broker network can be provided, increasing the flexibility of the system.

The broker computer system may include at least one further user broker system, and the service provider broker system may select the first user broker system on the basis of user broker identification data included in the request to decrypt encrypted user data.

In an untrusted system (for example), the service provider system may be operable to transmit the privacy policy data to the user broker system, and user broker system may include the verification means for verifying that the request complies with the or each privacy policy. The user broker system may further comprise means for authenticating the service provider broker system. Otherwise, in a trusted system (for example), the privacy policy verification can take place at the service provider broker system, and only the request for a key (for example) is passed to the user broker system.

In a yet further aspect of the invention there is provided a service provider system for use in a system for enforcing at least one privacy policy in relation to user data, the service provider computer system comprising: network interface means (such as a network interface device or router and the like, processor and associated memory) operable to: receive from a user computer system a digital container including encrypted user data and privacy policy data representing the or each privacy policy; transmit to a broker computer system a request to decrypt the encrypted user data in the digital container, the request including the privacy policy data from the digital container; and receive the encryption key from the broker computer system; and decryption means (such as a processor and associated memory, or dedicated cryptographic hardware, for example) for carrying out symmetric decryption of the encrypted user data with the encryption key.

The service provider system may be operable to select the broker computer system from a plurality of broker computer systems on the basis of user broker system identification data contained in the digital container, rather than obtaining the encryption key via a separate intermediary (such as a service provider broker system).

The service provider system may further comprise monitoring means (such as a background service executing on a processor and associated memory) operable to: monitor incoming network traffic to identify received digital containers; interact with the network interface means to decrypt user data in the digital containers; and store the decrypted user data for later use by the service provider system. This can allow the privacy management system to be incorporated relatively easily into existing service provider systems.

To further improve security, for example when the service provider system relates to a large organization in which internal security must be maintained, the service provider system may further comprise an internal broker system (for example in the form of a separate workstation), in communication with the network interface means, the internal broker system comprising: storage means for storing at least one encryption key obtained by the network interface means; input means for receiving a request to access user data in a digital container associated with one of the at least one encryption keys; verification means for verifying that the request complies with the or each privacy policy included in the digital container; and output means for outputting the stored encryption key corresponding to the received request if the verification means determines that the request complies with the or each privacy policy.

In another aspect of the invention there is provided a system for enforcing at least one privacy policy in relation to user data, the system including: a user computer system as aforesaid; a broker computer system as aforesaid; and a service provider computer system as aforesaid. The system may be connected via the Internet or similar network, for example.

The present invention also provides methods corresponding to the apparatus features mentioned above.

For example, in another aspect of the invention there is provided a method of enforcing at least one privacy policy in relation to user data, the method comprising: at a user system: encrypting the user data using a symmetric encryption algorithm and an encryption key generated in dependence on said at least one privacy policy and a master key associated with the user system; and transmitting the encrypted user data to a service provider in the form of a digital container that includes the encrypted user data and said at least one privacy policy; and at a broker system: receiving a request from the service provider to access the user data, the request including said at least one privacy policy; verifying that the request complies with said at least one privacy policy; and if so, regenerating the encryption key in dependence on the master key and at least one privacy policy supplied by the service provider; whereby the service provider system is able to decrypt the user data using a symmetric decryption algorithm and the regenerated encryption key.

In a further aspect of the invention there is provided a method for use by a broker computer apparatus in a system for enforcing at least one privacy policy in relation to user data, the method comprising: storing a master key; receiving a request to decrypt encrypted user data from a requesting system, the request including privacy policy data representing the or each privacy policy; verifying that the request complies with the or each privacy policy; and when it has been verified that the request does comply with the or each privacy policy, generating an encryption key, in dependence on the master key and in dependence on the privacy policy data, for transmission to the requesting system.

In a yet further aspect of the invention there is provided a method for use by a service provider apparatus in a system for enforcing at least one privacy policy in relation to user data, the method comprising: receiving from a user computer system a digital container including encrypted user data and privacy policy data representing the or each privacy policy; transmitting to a broker computer system a request to decrypt the encrypted user data in the digital container, the request including the privacy policy data from the digital container; receiving the encryption key from the broker computer system; and carrying out symmetric decryption of the encrypted user data with the encryption key.

The present invention can be implemented in any convenient form, for example using dedicated hardware, or a mixture of dedicated hardware and software. The present invention is particularly suited to implementation as computer software implemented by a workstation or laptop computer (in the case of the user computer system) or server system (in the case of the broker and service provider systems). The invention may further comprise a network, which can include any local area network or even wide area, conventional terrestrial or wireless communications network. The systems may comprise any suitably programmable apparatus such as a general-purpose computer, personal digital assistant, mobile telephone (such as a WAP or 3G-compliant phone) and so on. Aspects of the present invention encompass computer software implementable on a programmable device. The computer software can be provided to the programmable device using any conventional carrier medium. The carrier medium can comprise a transient carrier medium such as an electrical, optical, microwave, acoustic or radio frequency signal carrying the computer code. An example of such a transient medium is a TCP/IP signal carrying computer code over an IP network, such as the Internet. The carrier medium can also comprise a storage medium for storing processor readable code such as a floppy disk, hard disk, CD ROM, magnetic tape device or solid-state memory device.

Although each aspect and various features of the present invention have been defined hereinabove independently, it will be appreciated that, where appropriate, each aspect can be used in any combination with any other aspect(s) or features of the invention.

Embodiments of the present invention will now be described with reference to the accompanying drawings, in which.

A privacy enforcement system will now be described.

Figure 1:
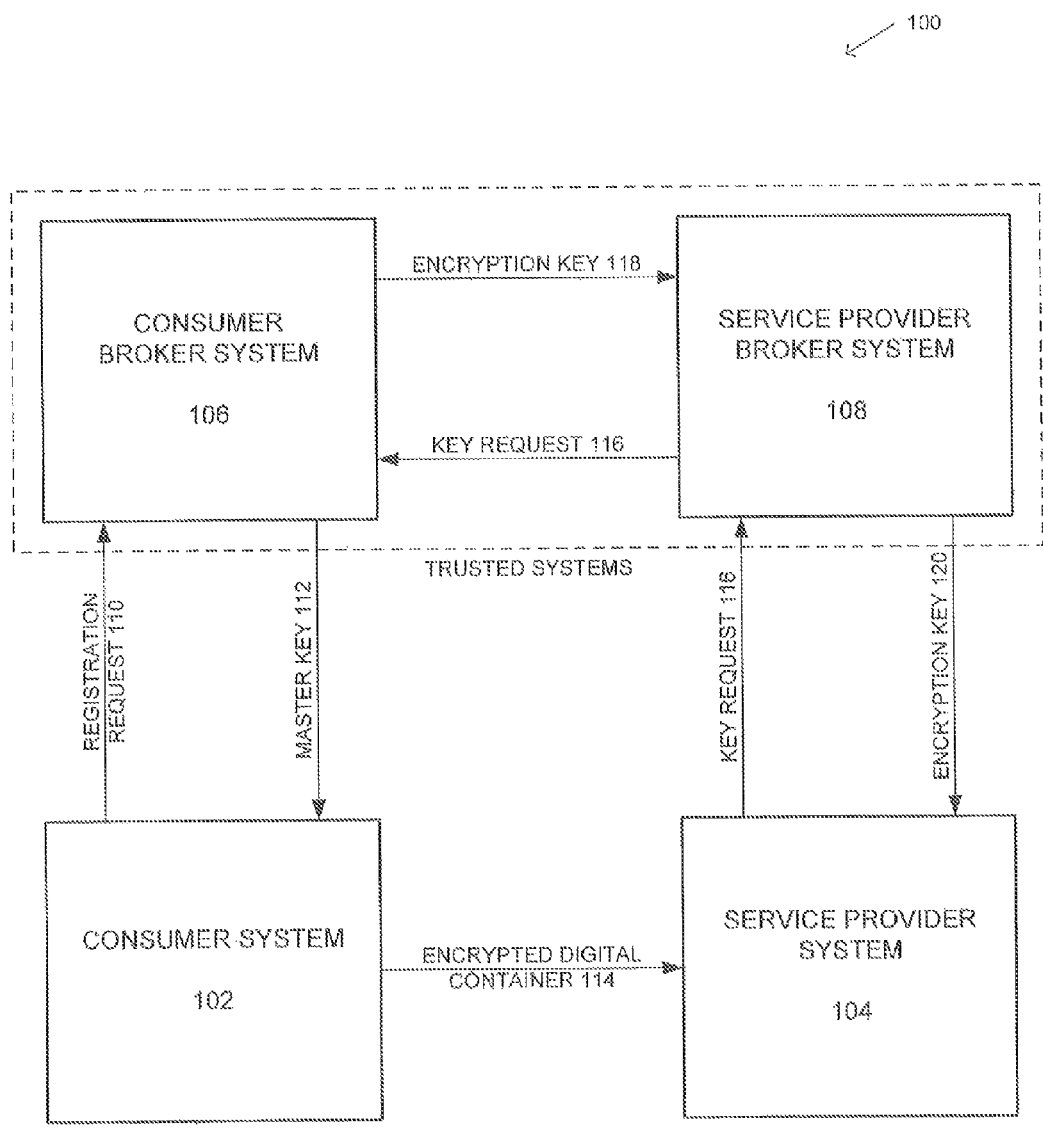
FIG. 1 is an overview of a privacy enforcement system in accordance with the present invention.

FIG. 1 illustrates the privacy enforcement system in overview. The system 100 comprises a consumer system 102, a service provider system 104, a consumer broker system 106 and a service provider broker system 108. The consumer broker system 106 and service provider broker system 108 constitute a trusted system. The consumer system 102 may be a personal computer workstation, for example, and the service provider system 104 may be located on the premises of an information services provider (ISP), or may be associated with an Internet website host, for example.

The system 100 aims to provide a mechanism by which the consumer system 102 can grant the service provider system 104 access to potentially sensitive consumer details when required, whilst at the same time ensuring that the service provider system 104 adheres to privacy policies dictated by the consumer.

In overview, the operation of the system involves a number of data transfers: a registration request 110 is sent by the consumer system 102 to the consumer broker system 106, and a master key 112 is sent by the consumer broker system 106 to the consumer system 102.

Consumer (user) data is transmitted from the consumer system 102 to the service provider system 104 in the form of an encrypted digital container 114. To access the container 114, the service provider system 104 sends a key request 116 to the service provider broker system 108, which in turn sends a key request 116 to the consumer broker system 106. The consumer broker system then sends the necessary encryption key 118 to the service provider broker system 108, and the encryption key 120 is then forwarded to the service provider system 104 to allow decryption of the user details. In a variant of the present embodiment, the master key is instead generated by the consumer system 102 and sent to the consumer broker system 106.

As is explained in more detail below, the encryption and decryption algorithms and the format of the digital container 114 and the key request 116 are chosen and/or designed such that the service provider system 104 cannot decrypt the consumer data if its request for a key does not comply with the user privacy policies, or if the privacy policies in the digital container are tampered with by the service provider system.

First, the structure of the system of FIG. 1 will be explained in more detail.

Figure 2:
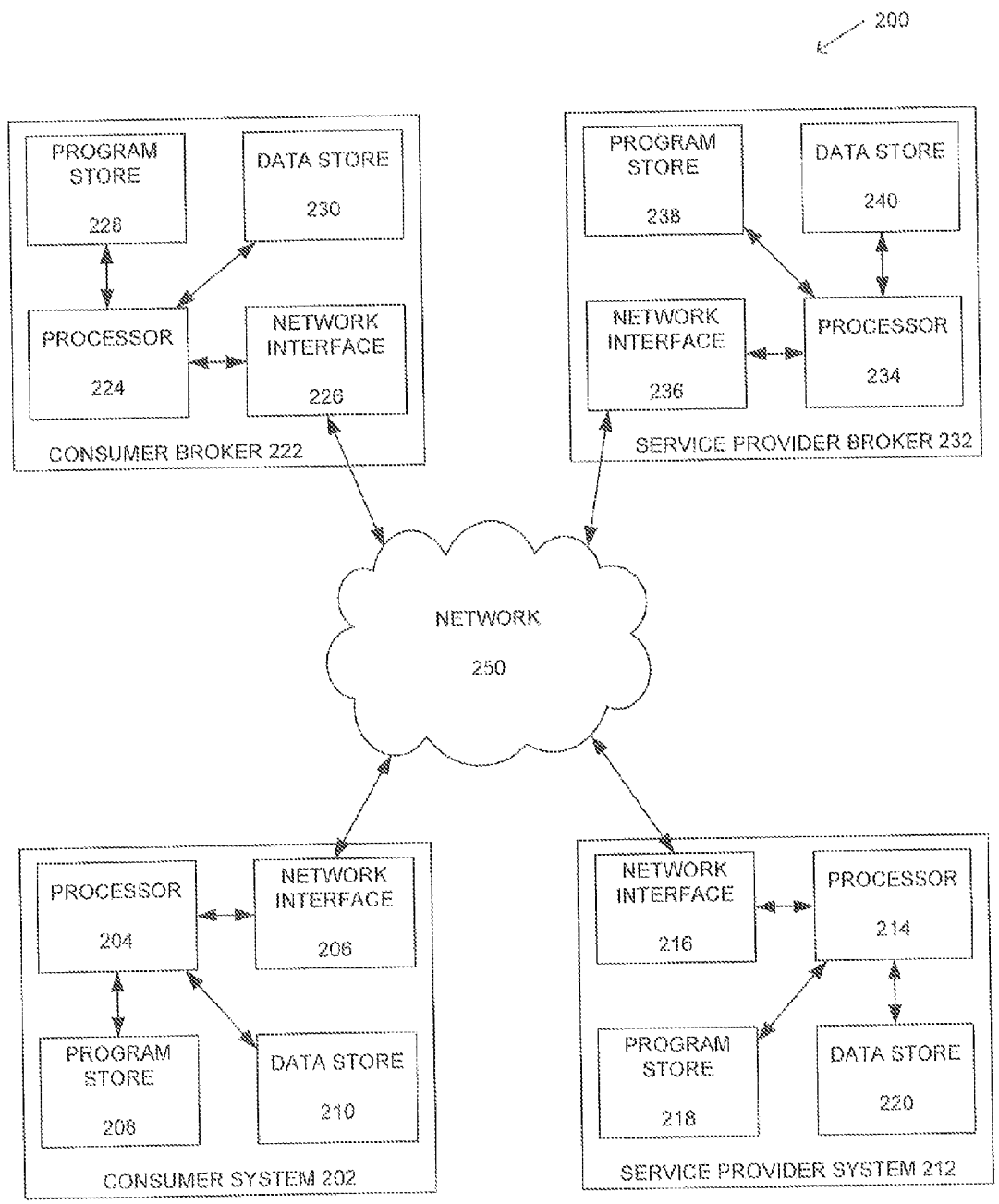
FIG. 2 is a schematic showing the components of the system of FIG. 1.

With reference to FIG. 2, the system 200 as before includes a consumer system 202, including a processor 204, network interface 206, program store 208 and data store 210; a service provider system 212, including a processor 214, network interface 216, program store 218 and data store 220; a consumer broker 222, including a processor 224, network interface 226, program store 228 and data store 230; and a service provider broker, including a processor 234, network interface 236, program store 238 and data store 240. The consumer system 202, service provider system 212, consumer broker system 222 and service provider broker system 232 are all interconnected via a network 250, such as the Internet or other wide- (or local-) area network.

The processor, network interface, program store and data store components of the consumer system 202, service provider system 212, consumer broker system 222 and service provider broker system 232 may be conventional computer system components or may be formed in part or in whole by custom software and/or hardware components. The program stores 208, 218, 228, 238 store program code for execution by the processors 204, 214, 224, 234 to carry out the functions of the system as described herein. The data stores 210 store program data operated on by the program code stored in the program stores, and also (where appropriate) store master key, encryption key, user data and digital container data. The program stores 208, 218, 228, 238 and data stores 210, 220, 230, 240 may be provided within the same physical memory device, such as RAM, ROM, flash memory, smart card(s), hard disc and other devices.

In a further embodiment, the consumer broker 222 and the service provider broker 232 are provided at the same location and/or using the same hardware. Any references herein to a separate consumer broker and service provider broker, and any reference to components thereof, may therefore be construed if appropriate as referring to a single device and/or set of components.

In the subsequent description of the system, the following terms will be referred to:

| Term | Meaning |
|------|---------|
| O | Consumer data to be protected |
| P | Privacy policies to be applied to the consumer data o |
| H | A one-way hash function for deriving encryption keys |
| S | A master secret (key/value) associated with a consumer |
| ID(s) | An identifier uniquely identifying the master secret s |
| ID(B) | An identifier uniquely identifying the user broker system B |
| K | A symmetric encryption key for encrypting/decrypting data |
| $Enc_k(o)$ | The encryption of the consumer data o with the encryption key k using a symmetric key algorithm (such as AES) |
| $Dec_k(o)$ | The decryption of the consumer data o with the encryption key k using the same symmetric key algorithm |
| C | A checksum |
| AD | Access data used for purposes of authentication |

Figure 3:
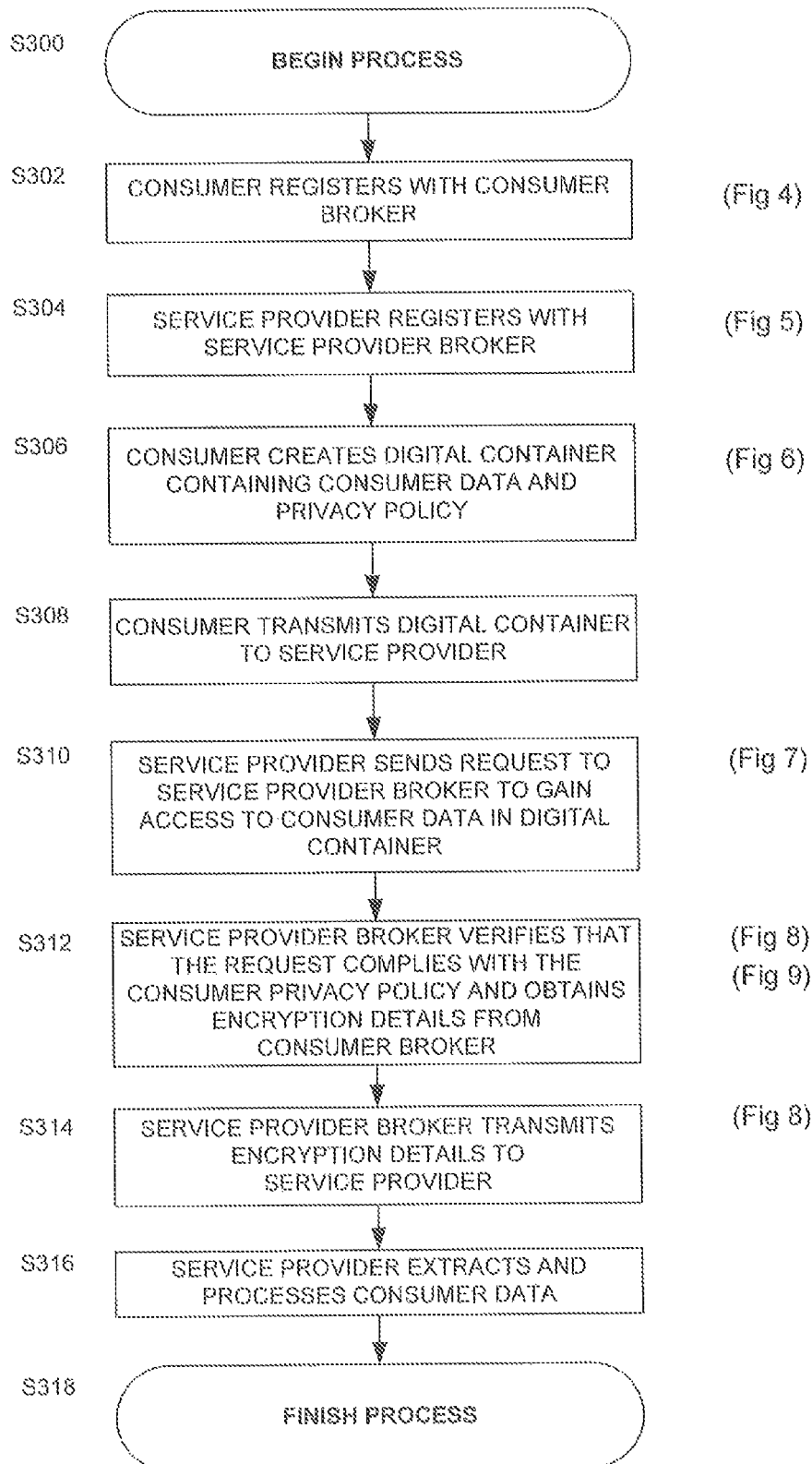
FIG. 3 is a flowchart showing the operation of the system of FIG. 1 in overview.

FIG. 3 is a flowchart illustrating the operation of the system in overview.

In step S300, the process of enforcing a consumer's privacy policies begins. First of all (step S302), the consumer registers with a consumer broker. The service provider also registers (step S304) with a service provider broker. To transfer consumer details, the consumer (user) system creates (step S306) a digital container containing the consumer data and the privacy policy. Where appropriate, any reference to a privacy policy may be construed as referring to a plurality of privacy policies. The consumer then transmits (step S308) the digital container to the service provider. To access the container, the service provider sends a request (step S310) to the service provider broker to gain access to the consumer data in the digital container. The service provider broker verifies (step S312) that the request complies with the consumer privacy policy and obtains encryption details from the consumer broker. The service provider broker then transmits (step S314) encryption details to the service provider. The service provider extracts the consumer data using the encryption details, and processes the data (step S316), ending the process (step S318).

The registration steps S302, S304 are clearly interchangeable and may be carried out by electronic or other means (for example they may involve physical authentication methods, or be carried out by mail or over the telephone, and the like).

Figure 4:
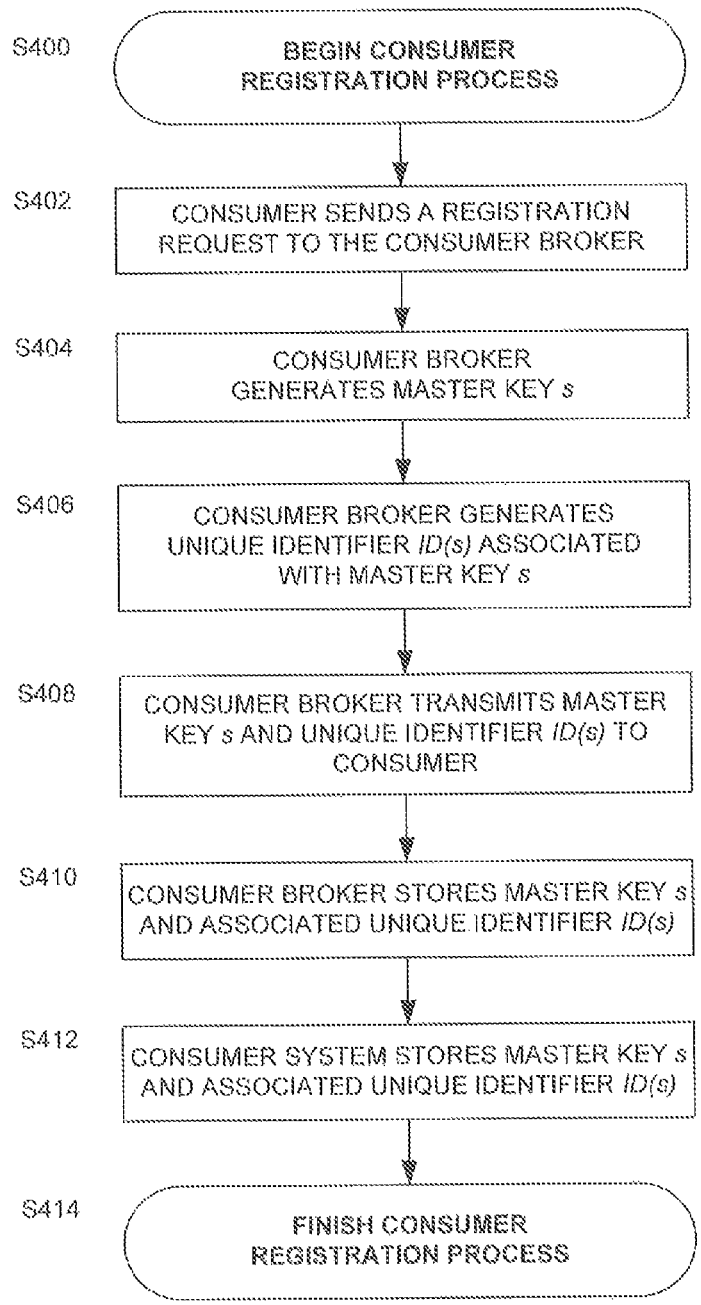
FIG. 4 is a flowchart illustrating the consumer registration process in the system of FIG. 1.

FIG. 4 illustrates the consumer registration process (S302) in more detail.

After the consumer registration process begins (step S400), the consumer sends a registration request to the consumer broker (step S402). As mentioned previously, this request may be electronic, for example in the form of the user submitting details via a web form on the Internet, or an automated process between the consumer and consumer broker computer systems. In response to the request, the consumer broker generates (step S404) a master key s which is associated uniquely with the consumer in question. The consumer broker generates (step S406) a unique identifier ID(s) to uniquely identify the master key s. A suitable ID(s) is chosen such that it can be transmitted freely without compromising the content of the key s. The key s and identifier ID(s) are then transmitted (step S408) to the consumer system. The consumer broker system (step S410) and the consumer system (step S412) both store the master key s and the associated identifier ID(s), ending the consumer registration process (step S414).

Figure 5:
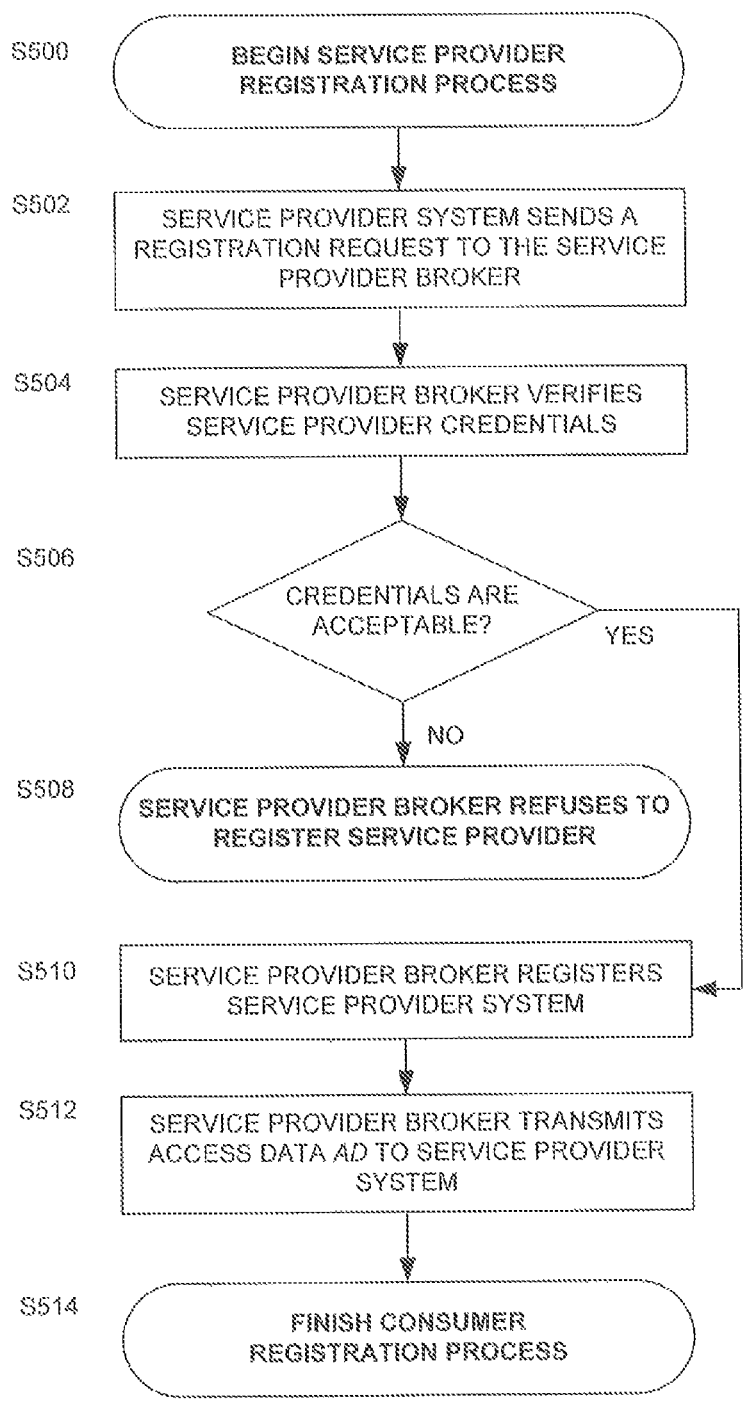
FIG. 5 is a flowchart illustrating the service provider registration process in the system of FIG. 1.

FIG. 5 illustrates the service provider registration process (S304) in more detail.

After the service provider registration process begins (step S500), the service provider system sends a registration request to the service provider broker (step S502). The service provider broker verifies the service provider credentials (electronically or otherwise) in step S504, and if the credentials are not acceptable (step S506), the service provider broker refuses to register the service provider (step S508). Otherwise the service provider broker registers the service provider system (step S510) and transmits access data AD to the service provider system (step S512). The process then ends (step S514). The access data AD serves as a means of authenticating the service provider in any future communications with the service provider broker system, and avoids the need for re-registration or re-establishment of trust later on.

The registration request in step S502 includes attributes relating to the service provider, for example providing details of the data sharing policies of the service provider. In a variant of the present embodiment the service provider credentials are provided to the service provider broker system directly by a trusted third party (such as a certification authority) rather than by the service provider (for increased security).

Figure 6:
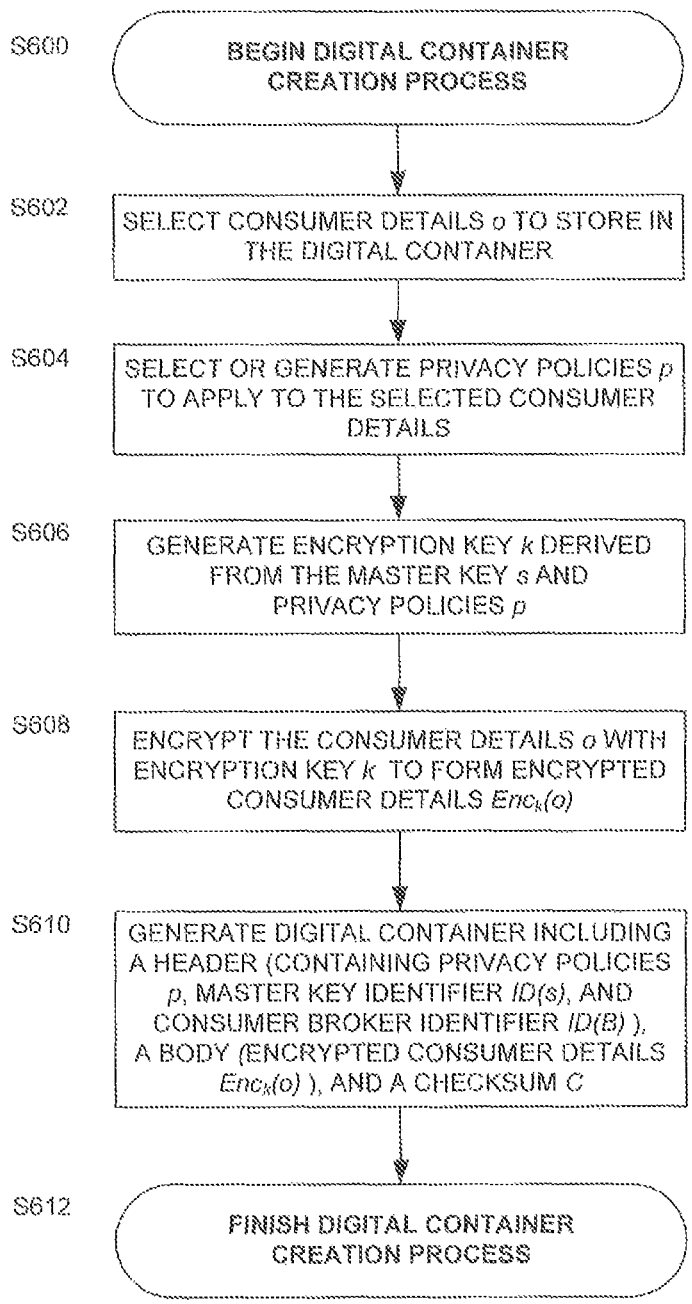
FIG. 6 is a flowchart illustrating the digital container creation process in the system of FIG. 1.

FIG. 6 illustrates the digital container creation process (S306) in more detail.

After the process begins (step S600), the consumer (via the consumer system) selects (step S602) consumer details o to store in the digital container. The consumer (via the consumer system) then selects or generates (as the case may be, in step S604) a set of privacy policies p to apply to the selected consumer details o. The selection of consumer details and privacy policies may be made via a user interface provided, for example, by a web browser plug-in. In step S606 the consumer system generates an encryption key k, derived from the master key s and the privacy policies p, by computing $H(p_1, p_2, p_3, \ldots, p_n, s)$, where H is a one-way hash function (such as SHA-1) and $p_1$-$p_n$ are individual data elements (corresponding to individual rules, for example) of the privacy policy data.

The consumer system then encrypts (step S608) the consumer details o with the encryption key k to form encrypted consumer details $Enc_k(o)$. The consumer system then generates (step S610) a digital container including a header (including the privacy policies p, the master key identifier ID(s) and consumer broker identifier ID(B)), a body including the encrypted consumer details $Enc_k(o)$, and a checksum C. The process then finishes (step S612).

Figure 7:
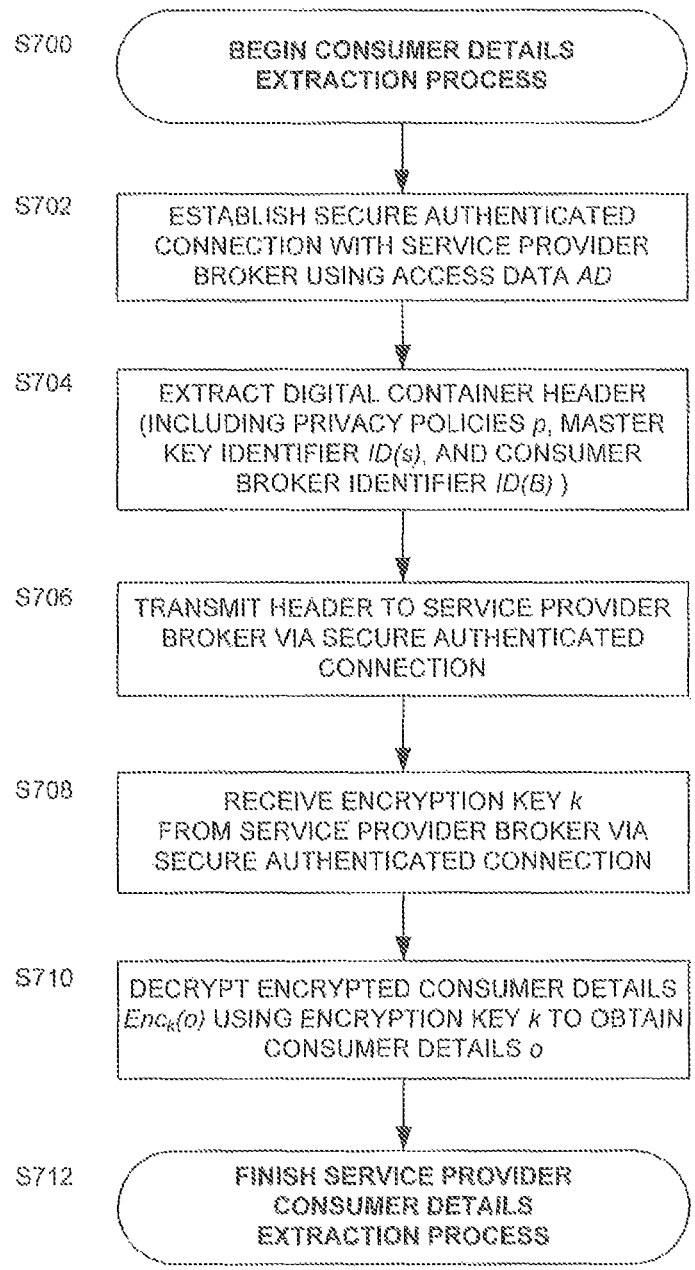
FIG. 7 is a flowchart illustrating the consumer details extraction process in the system of FIG. 1.

FIG. 7 illustrates the consumer details extraction process (S310) in more detail.

After the process begins (step S700), the service provider establishes (step S702) a secure authenticated connection ('SAC') with the service provider broker using the access data AD previously provided to it by the broker. The service provider computer system then extracts (step S704) the digital container header (including the privacy policies p, the master key identifier ID(s) and consumer broker identifier ID(B)). The service provider system then transmits (step S706) the header to the service provider broker via the SAC. In response (provided that the request for a key complies with the privacy policies p), the service provider system then receives (step S708) an encryption key k from the service provider broker via the SAC. The service provider system then decrypts (step S710) the encrypted consumer details $Enc_k(o)$ using the encryption key k and a decryption algorithm $Dec_k(\ )$ that mirrors the encryption algorithm $Enc_k(\ )$. The process then ends (step S712).

Figure 8:
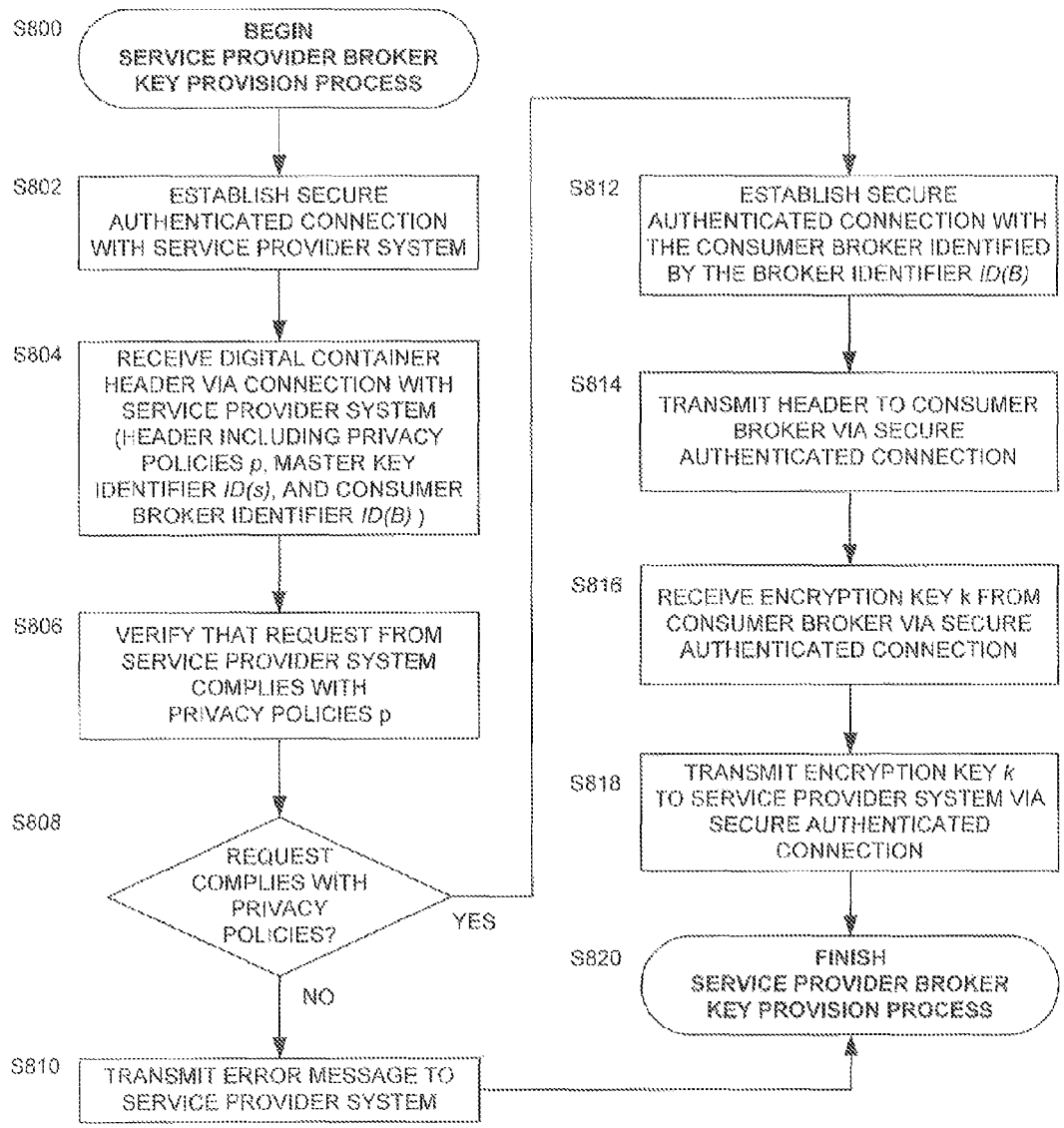
FIG. 8 is a flowchart illustrating the service provider broker key provision process in the system of FIG. 1.

FIG. 8 illustrates the service provider broker key provision process (forming part of step S312) in more detail.

After the process begins in step S800, the service provider broker establishes (step S802) a secure authenticated connection ('SAC') with the service provider system (using the access data AD mentioned above). The service provider broker receives (step S804) the digital container header (including the privacy policies p, the master key identifier ID(s) and consumer broker identifier ID(B)) via the SAC, and verifies (steps S806, S808) that the request to access the consumer data complies with the privacy policies p, for example by evaluating a series of rules embodied in the privacy policies. If the requested usage is deemed to be incompatible with the privacy policies p, the service provider broker transmits (step S810) an error message to the service provider system, and finishes the process (step S820) without rendering an encryption key to the service provider.

Otherwise, if the key request is valid, the service provider broker then establishes (step S812) another secure authenticated connection ('SAC') with the consumer broker identified by the broker identifier ID(B). The service provider broker then transmits (step S814) the digital container header to the consumer broker via the second SAC. In response, the service provider broker receives (step S816) an encryption key k from the consumer broker via the second SAC, and transmits (step S818) the key k to the service provider system via the first SAC. The process then finishes (step S820).

Depending on the privacy policy in question, the verification process (steps S806, S808) may include evaluating attributes relating to the service provider system (such as levels of trust and data sharing policies) and evaluating other factors such as the current time (to ensure that the privacy policy has not expired), for example.

Figure 9:
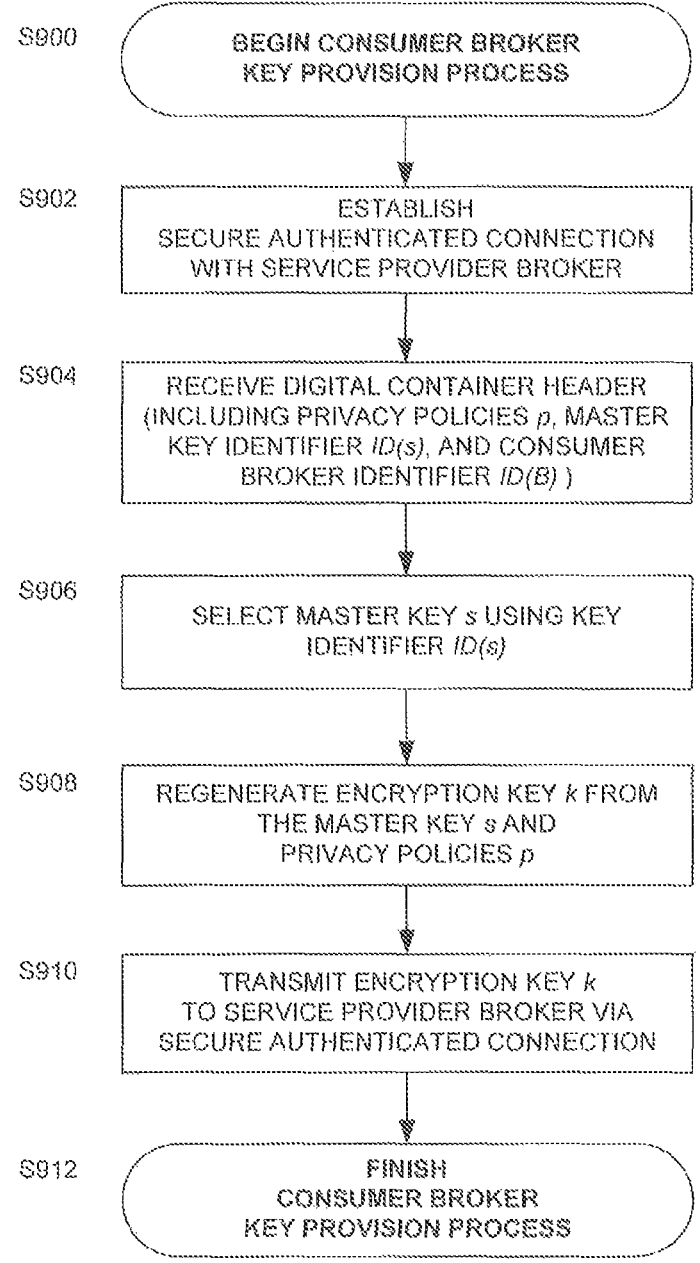
FIG. 9 is a flowchart illustrating the consumer broker key provision process in the system of FIG. 1.

FIG. 9 illustrates the consumer provider broker key provision process (forming part of step S312) in more detail.

After the process begins in step S900, the consumer broker system establishes (step S902) a secure authenticated connection ('SAC') with the service provider broker, as a result of step S812 above. In step S904, the consumer broker system receives the digital container header (including the privacy policies p, the master key identifier ID(s) and consumer broker identifier ID(B)). The consumer broker system then selects (step S906) the relevant master key s using the key identifier ID(s), and regenerates (step S908) the encryption key k using the master key s and the privacy policies p, in a process corresponding to the key generation process carried out by the consumer system in step S606 of FIG. 6 mentioned above. In step S910 the consumer broker system transmits the regenerated encryption key k to the service provider broker via the SAC, after which the process finishes (step S912).

With reference to step S908, if the same master key s and the same privacy policies p are used, the same encryption key k should be generated by the consumer broker system as was generated by the consumer system. Any alteration of the privacy policies p (for example by the service provider) will result in a different encryption key k being generated, and will lead to a failure to decrypt the consumer details. In a variant of the present embodiment, for example when the service provider broker is untrusted, the privacy policy verification steps S806, S808 carried out by the service provider broker are instead carried out by the consumer broker system.

Figure 10:
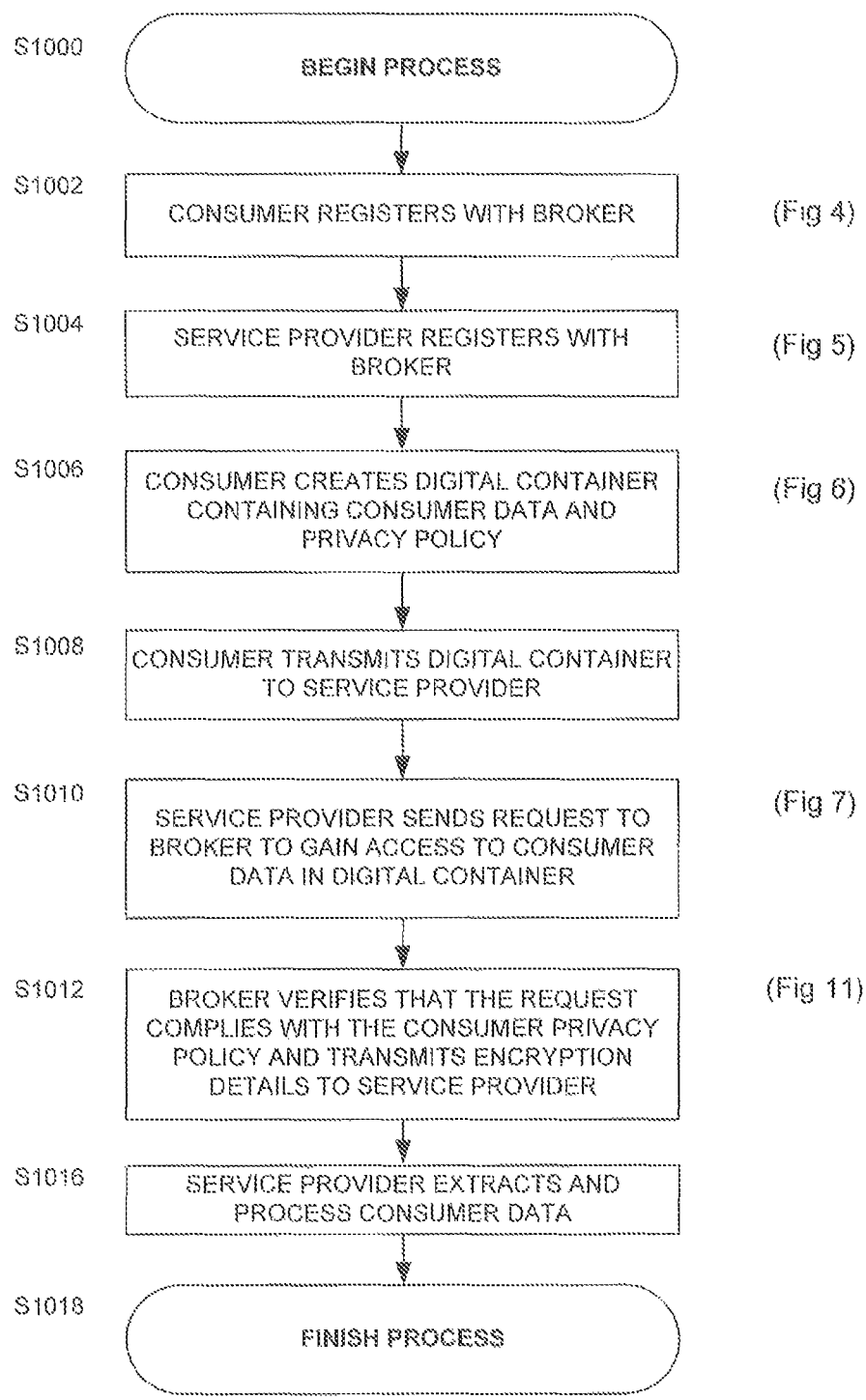
FIG. 10 is a flowchart showing the operation of an alternative embodiment of the system of FIG. 1 in overview.

FIG. 10 illustrates an alternative embodiment of the privacy enforcement process, in which a single broker system is provided instead of the separate consumer and service provider broker systems.

After the process begins (step S1000), the consumer and the service provider register (steps S1002, S1004) with the broker as before, and again the consumer creates (step S1006) a digital container containing the consumer data and privacy policy and transmits (step S1008) the container to the service provider system. The service provider then sends (step S1010) a request to the broker to gain access to the consumer data in the digital container, and the broker verifies that the request complies with the consumer privacy policy and transmits encryption details to the service provider (step S1012). The service provider can then extract and process the consumer data (step S1014), after which the process ends (step S1016).

Figure 11:
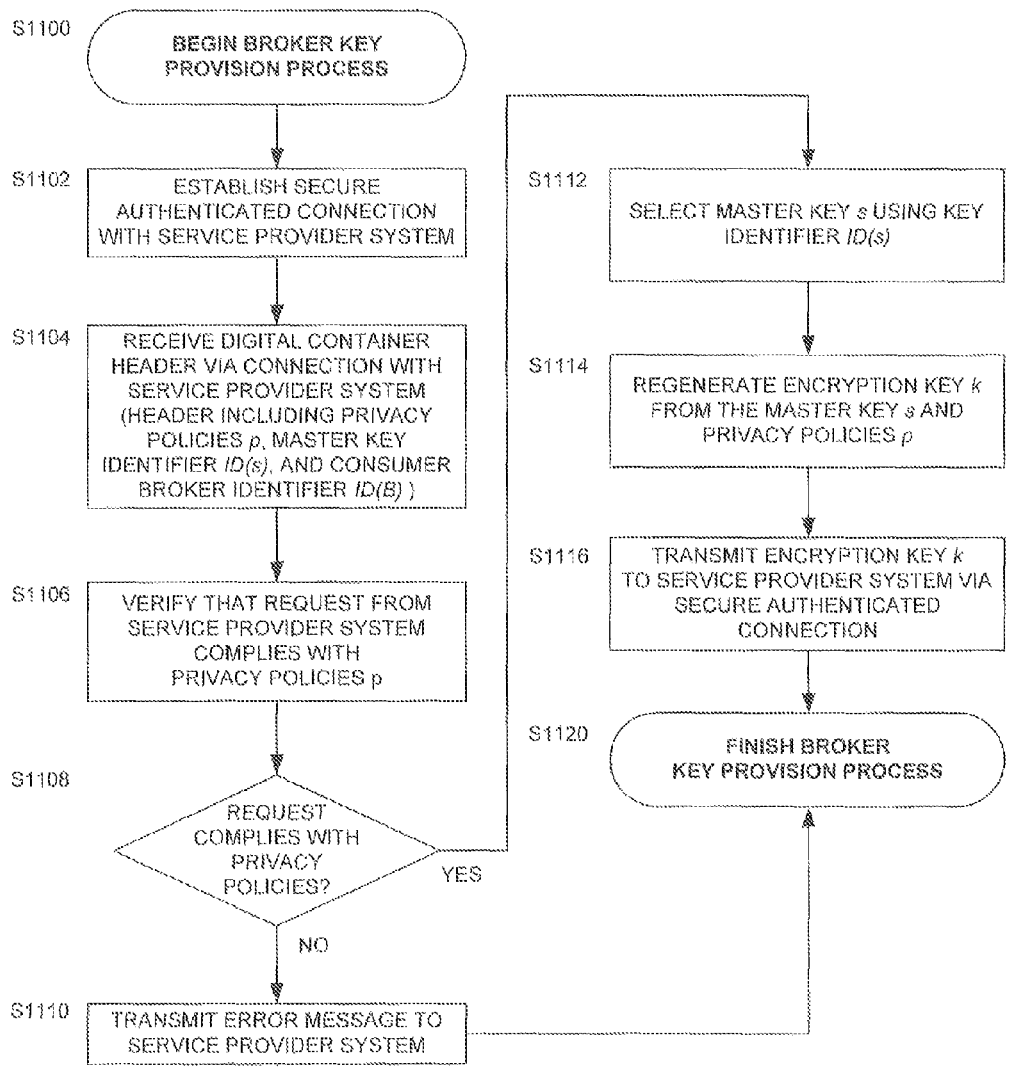
FIG. 11 is a flowchart illustrating the service provider broker key provision process of the system of FIG. 10.

FIG. 11 illustrates the broker key provision process of step S1012 of FIG. 10 in more detail.

After the process begins (step S1100), the broker establishes (step S1102) a secure authenticated connection ('SAC') with the service provider, receives (step S1104) a digital container header, and verifies that the request complies with the privacy policies p (steps S1106, S1108) as before, raising an error (step S1110) if the policies are violated. If the policies are complied with, the broker then selects (step S1112) the master key s matching the key identifier ID(s), and regenerates the encryption key k from the master key s and privacy policies p as before. The broker then transmits (steps S1114) the encryption key k to the service provider via the SAC, and the process ends (step S1116).

In a variant of the alternative embodiment, multiple broker systems are provided and interconnected such that the consumer system and/or service provider system are not bound to a single broker, but can choose one of a plurality of brokers to communicate with. The brokers may be trust authorities such as those responsible for issuing digital certificates on the Internet, for example.

Figure 12:
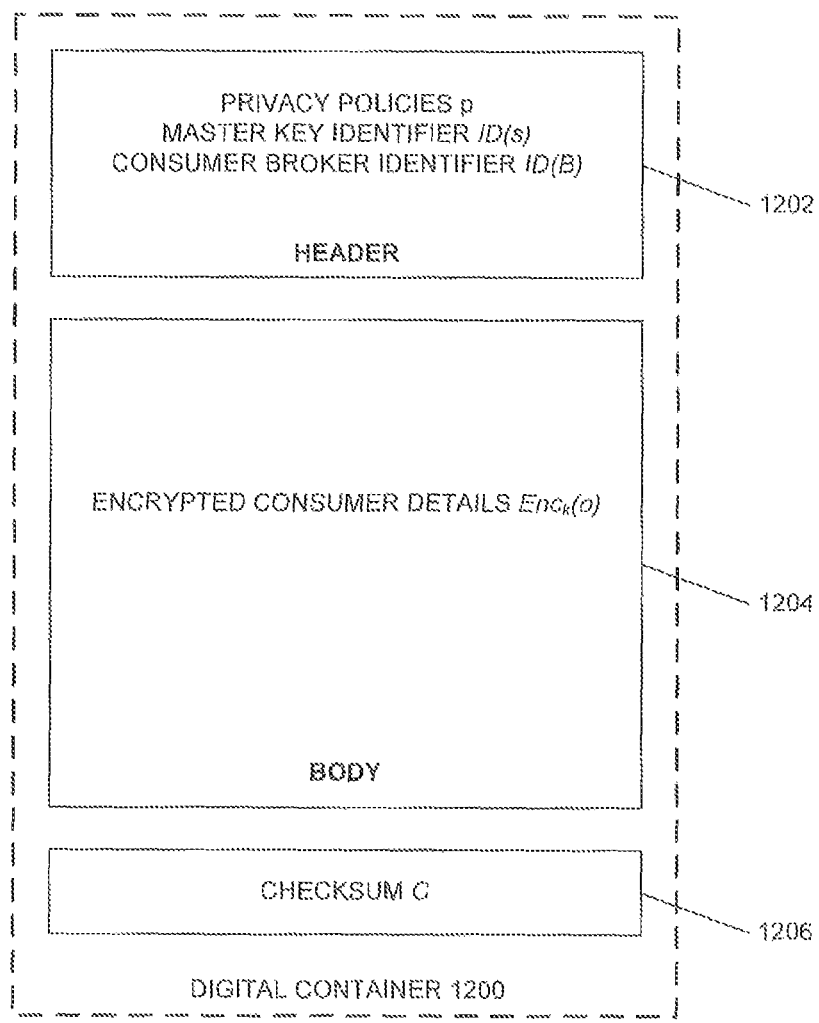
FIG. 12 is a illustration of the digital container format of the systems of FIGS. 1 and 10.

FIG. 12 illustrates the structure of the digital container mentioned above.

As previously mentioned, the digital container 1200 contains a header portion 1202, a body 1204 and a checksum C 1206. The header 1202 includes the privacy policies p, the master key identifier ID(s) and consumer broker identifier ID(B). The body 1204 contains the encrypted consumer details $Enc_k(o)$. The checksum C is provided to ensure data integrity during transmissions of the digital container, and to help prevent unauthorized alterations of the content. The digital container is provided as a set of data values which can be encoded in any appropriate form (represented by alphanumeric text strings for easy compilation and modification, or encoded in raw hexadecimal data, for example, for compactness and reducing the potential for casual tampering with the contents). The header, body and checksum portions represent conceptual distinctions, but are not necessarily reflected in a physical separation of the data values (this is possible, for example by providing separate data files for each portion, although this may reduce the security and convenience of the system). The digital container may be further encrypted, compressed or obfuscated before, during and after transmission.

Figure 13:
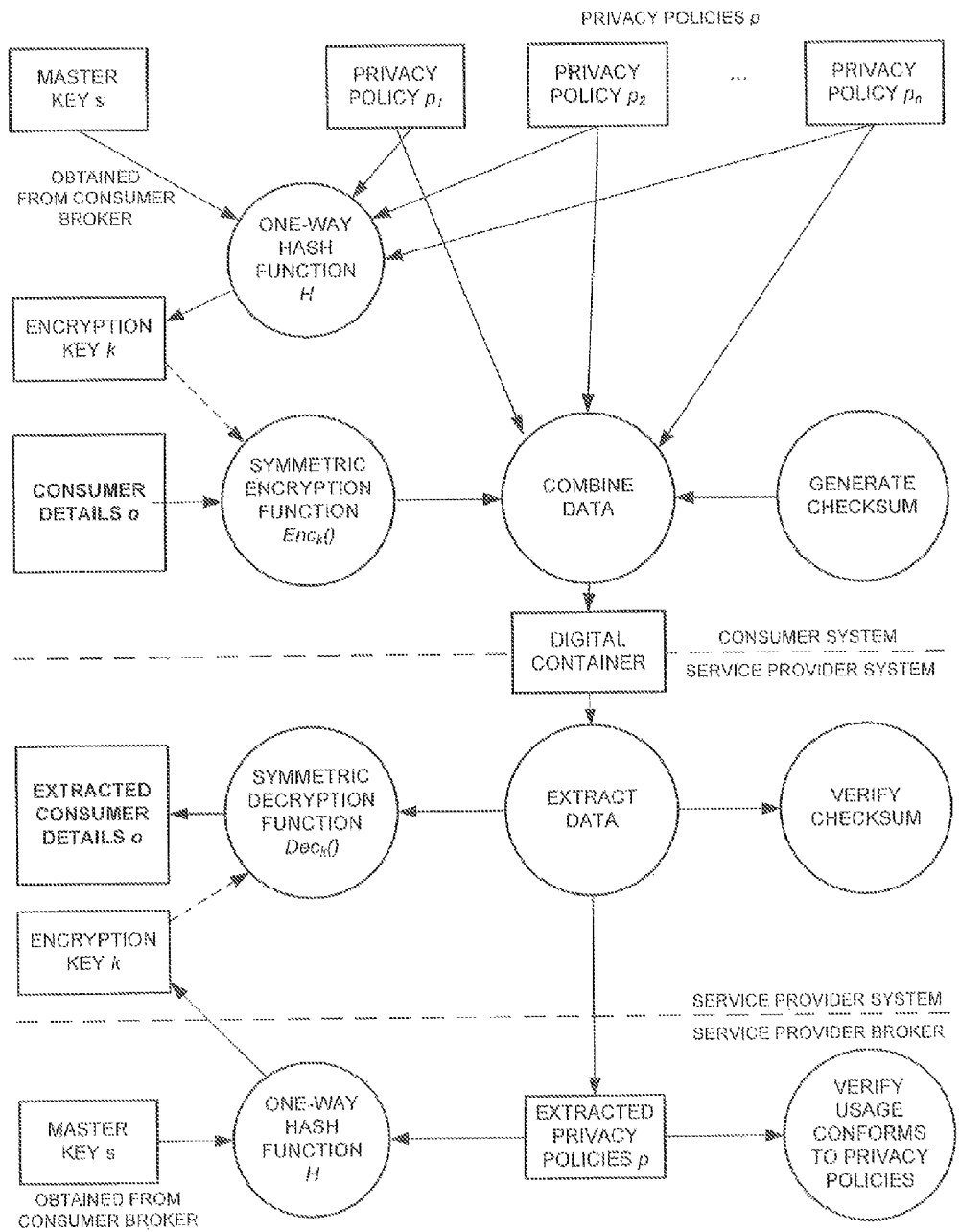
FIG. 13 is an overview of the data processing carried out in the system of FIG. 1.

FIG. 13 is a diagrammatic overview of the data processing carried out in the system of FIG. 1. The processes taking place correspond to those described above with reference to FIGS. 1 to 12.

When the service provider system relates to a large or relatively insecure organization, for example, a further refinement of the system may be desired in order to limit the potential for security breaches. One way to do this is by providing an internal broker system within the service provider system, to limit access to the consumer details and to allow auditing of any access requests.

Figure 14:
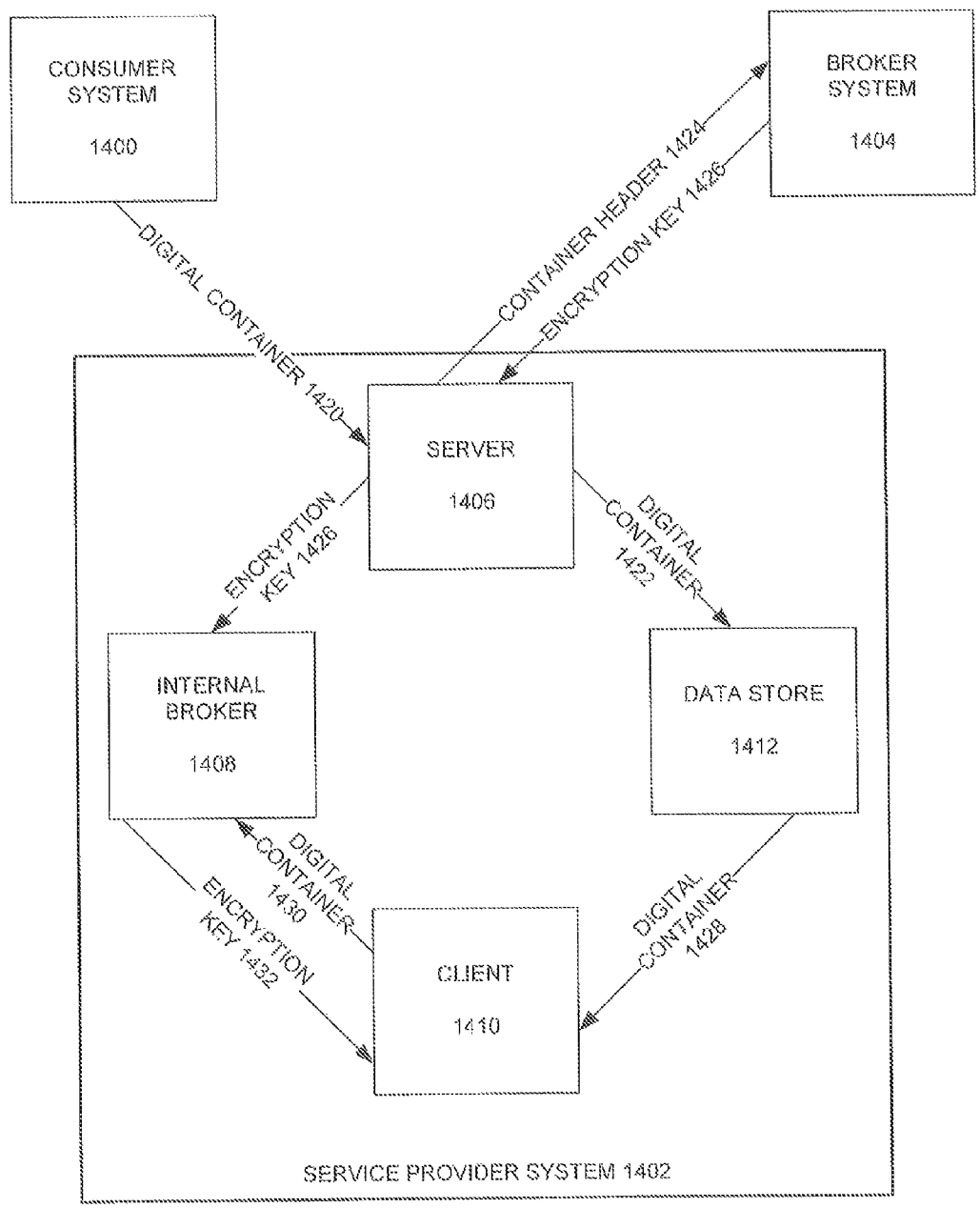
FIG. 14 is a schematic illustrating an internal broker system in the servicer provider system of FIG. 1.

FIG. 14 is a schematic illustrating such an internal broker system in the service provider system of FIG. 1.

The consumer system 1400, service provider system 1402 and broker system 1404 are shown. The service provider system 1402 as shown includes a server 1406, internal broker 1408, client device 1410 and data store 1412.

In use, the consumer system 1400 transmits a digital container 1420 to the service provider system 1402 as has been described previously. The digital container is stored 1422 in the data store 1412 after receipt. At the same time (or, alternatively, before or afterwards) the internal broker extracts the digital container header and transmits the header 1424 to the broker system 1404 via the server 1406 (which may include routing and firewall elements, for example). The broker system 1404 then returns the encryption key 1426 as before, which is routed to the internal broker 1408 via the server 1406. The broker system 1404 stores the encryption key for later use.

If the client 1410 wishes to access the consumer details, it must first retrieve the digital container 1428 from the data store 1412, and forward 1430 the digital container (or header portion) to the internal broker in order to gain access to the contents. The internal broker can then log the access request and/or verify that the request complies with the consumer (or service provider) privacy policies before returning the encryption key 1432 necessary to decrypt the container.

In a variant of this system, the internal broker carries out the decryption and/or digital container storage, and instead returns the decrypted user details to the requesting system.

In this and other systems described above, every request to access consumer details can be logged by the relevant broker or service provider, and provided to the consumer or other entity (such as a privacy monitoring organization) in the form of raw data or as a formatted report, for example. It is also possible to modify the system such that any request to access consumer details is forwarded to the consumer, or a consumer proxy other than the consumer broker, for explicit approval before the request is granted.

It will be apparent that the various features described herein relating to the consumer system, service provider system, service provider broker system and consumer broker system are interchangeable (as appropriate) such that, for example, the processing of a user's digital container to extract encrypted user data may be carried out by the service provider broker system instead of the service provider system, and so on.

It will be appreciated that the embodiments described above cannot provide completely guaranteed enforcement of privacy policies, for example in the event of unauthorized physical or other intrusions into the broker or service provider systems and the like. However, it will also be appreciated that the degree of skill and/or effort required to violate the user's privacy in the present system is clearly greater than that required to violate the user's privacy in a prior art system in which sensitive user data is transmitted without any form of protection.

Further modifications lying within the spirit and scope of the present invention will be apparent to a skilled person in the art.

The invention claimed is:

1. A system for enforcing at least one privacy policy in relation to user data, the system comprising:
    a user system;
    a broker system; and
    a service provider system,
    wherein the user system comprises:
        one or more processors and one or more associated memory devices;
        an encryption key generation means for generating an encryption key in dependence on a master key and in dependence on privacy policy data representing the at least one privacy policy, the encryption key generation means being software implemented by the one or more processors and the one or more associated memory, dedicated circuitry, or a combination thereof;
        an encryption means for carrying out symmetric encryption of the user data with the encryption key to form encrypted user data, the encryption means being software implemented by the one or more processors and the one or more associated memory, dedicated circuitry, or a combination thereof;
        a combiner means for combining the encrypted user data and the privacy policy data to form a digital container for secure transmission of the user data, the combiner means being software implemented by the one or more processors and the one or more associated memory, dedicated circuitry, or a combination thereof; and
        a network interface for transmitting the digital container to the service provider system over a computer network; and
    wherein the broker system is operable to:
        receive a request from the service provider system over the computer network to access the user data, the request including said privacy policy data;
        verify that the request complies with said at least one privacy policy; and
        if so, regenerate the encryption key in dependence on the master key and at least one privacy policy supplied by the service provider system to the broker system over the computer network, and transmit the regenerated encryption key to the service provider system;
    whereby the service provider system is able to decrypt the user data using a symmetric decryption algorithm and the regenerated encryption key.

2. The system of claim 1, wherein the encryption key generation means is operable to derive the encryption key from an output of a one-way hash function that takes the master key and the privacy policy data as an input.

3. The system of claim 2, wherein the encryption key generation means is adapted to select the hash function from a plurality of hash functions, and the combining means is operable to include hash function identification data in the container, the hash function identification data being associated with the selected hash function.

4. The system of claim 1, further comprising secure communication means for establishing a secure connection with the broker computer system, and wherein the user computer system is operable to transfer the master key between the user computer system and the broker computer system via the secure connection.

5. The system of claim 1, wherein the combining means is operable to include broker identification data in the digital container, the broker identification data being associated with the broker computer system.

6. The system of claim 1, further comprising means for receiving usage data from the broker computer system, the usage data relating to a request to decrypt the digital container received by the broker computer system.

7. The system of claim 1, wherein the combining means is operable to include master key identification data in the digital container, the master key identification data being associated with the master key.

8. The system of claim 1, further comprising means for storing the digital container, whereby the digital container is transmitted on demand.

9. The system of claim 1, wherein the user computer system is operable to generate and transmit the digital container in response to a request.

10. The system of claim 1, wherein the user computer system is operable to execute a web browser plug-in embodying at least one of the encryption key generation means, encryption means and combiner means.

11. The system according to claim 1, wherein the network interface is further for communicating with the broker computer system.

12. A method of enforcing at least one privacy policy in relation to user data, the method comprising:
    at a user computer system:
        generating an encryption key in dependence on a master key and in dependence on privacy policy data representing the at least one privacy policy;
        carrying out symmetric encryption of the user data with the encryption key to form encrypted user data;
        combining the encrypted user data and the privacy policy data to form a digital container for secure transmission of the user data;
        communicating with a broker computer system over a computer network and transmitting the digital container to a service provider system over the computer network; and
        transmitting the digital container to the service provider system; and
    at the broker computer system:
        receiving a request from the service provider system over the computer network to access the user data, the request including said privacy policy data;
        verifying that the request complies with said at least one privacy policy; and
        if so, regenerating the encryption key in dependence on the master key and at least one privacy policy supplied by the service provider system, and transmitting the regenerated encryption key to the service provider system;
    whereby the service provider system is able to decrypt the user data using a symmetric decryption algorithm and the regenerated encryption key.

13. The method according to claim 12, further comprising communicating with the broker computer system.

14. The method according to claim 12, wherein the step of generating the encryption key includes deriving the encryption key from an output of a one-way hash function that takes the master key and the privacy policy data as an input.

15. The method according to claim 14, further comprising selecting the hash function from a plurality of hash functions, and including hash function identification data in the container, the hash function identification data being associated with the selected hash function.

16. The method according to claim 12, further comprising establishing a secure connection with the broker computer system, and transferring the master key between the user computer system and the broker computer system via the secure connection.

17. The method according to claim 12, further comprising including broker identification data in the digital container, the broker identification data being associated with the broker computer system.

18. The method according to claim 12, further comprising receiving usage data from the broker computer system, the usage data relating to a request to decrypt the digital container received by the broker computer system.

19. The method according to claim 12, further comprising including master key identification data in the digital container, the master key identification data being associated with the master key.

20. The method according to claim 12, further comprising storing the digital container, whereby the digital container is transmitted on demand.

21. The method according to claim 12, further comprising generating and transmitting the digital container in response to a request.

22. The method according to claim 12, further comprising providing a web browser plug-in operable to perform at least one of the steps of generating the encryption key, carrying out symmetric encryption of the user data, and combining the encrypted user data and the privacy policy data.

* * * * *